US008352738B2

(12) United States Patent
Parno et al.

(10) Patent No.: US 8,352,738 B2
(45) Date of Patent: Jan. 8, 2013

(54) METHOD AND APPARATUS FOR SECURE ONLINE TRANSACTIONS

(75) Inventors: Bryan Parno, Pittsburgh, PA (US); Cynthia Kuo, Pittsburgh, PA (US); Adrian Perrig, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 1216 days.

(21) Appl. No.: 11/998,890

(22) Filed: Dec. 3, 2007

(65) Prior Publication Data

US 2010/0049975 A1    Feb. 25, 2010

Related U.S. Application Data

(60) Provisional application No. 60/872,251, filed on Dec. 1, 2006.

(51) Int. Cl.
*H04L 9/32* (2006.01)
*G06Q 20/00* (2012.01)

(52) U.S. Cl. ................ 713/168; 726/5; 705/73

(58) Field of Classification Search .......... 713/168; 726/5
See application file for complete search history.

(56) References Cited

U.S. PATENT DOCUMENTS 4,227,253 A * 10/1980 Ehrsam et al. ............ 380/45
6,209,027 B1 * 3/2001 Gibson ..................... 709/218
7,822,200 B2 * 10/2010 Cameron et al. ........... 380/44
2002/0007456 A1 * 1/2002 Peinado et al. ............ 713/164
2002/0026575 A1 * 2/2002 Wheeler et al. ........... 713/156
2003/0080986 A1 * 5/2003 Baird ..................... 345/700

OTHER PUBLICATIONS

Chou, N., Ledesma, R., Teraguchi, Y., Mitchell, J.C., Client-side defense against web-based identity theft, In NDSS, Feb. 2004.
Dhamija, R., Tygar, J.D., The Battle Against Phishing: Dynamic Security Skins, In ACM Symposium on Usable Security and Privacy (SOUPS '05), Jul. 2005.
Dhamija, R., Tygar, J.D., Phish and HIPs: Human nteractive Proofs to Detect Phishing Attacks, In Human Interactive Proofs: Second International Workshop (HIP 2005), May 2005.
Haller, N., The S/Key One-Time Password System, In Proceedings of the Symposium on Network and Distributed Systems Security, pp. 151-157, Feb. 1994.
Herzberg, A., Gbara, A., Trustbar: Protecting (even naive) Web Users From Spoofing and Phishing Attacks, Cryptology ePrint Archive, Report 2004/155, 2004.

(Continued)

*Primary Examiner* — Gilberto Barron, Jr.
*Assistant Examiner* — Devin Almeida
(74) *Attorney, Agent, or Firm* — Jones Day

(57) ABSTRACT

Phishing attacks succeed by exploiting a user's inability to distinguish legitimate websites from spoofed websites. Most prior work focuses on assisting the user in making this distinction; however, users must make the right security decision every time. Unfortunately, humans are ill-suited for performing the security checks necessary for secure site identification, and a single mistake may result in a total compromise of the user's online account. Fundamentally, users should be authenticated using information that they cannot readily reveal to malicious parties. Placing less reliance on the user during the authentication process enhances security and eliminates many forms of fraud. We disclose using a trusted device to perform mutual authentication that eliminates reliance on perfect user behavior, thwarts Man-in-the-Middle attacks after setup, and protects a user's account even in the presence of keyloggers and most forms of spyware.

19 Claims, 4 Drawing Sheets

OTHER PUBLICATIONS

Jakobsson, M., Modeling and Preventing Phishing Attacks, In Financial Cryptography, 2005.

MacKenzie, P., Reiter, M.K., Networked cryptographic devices resilient to capture, International Journal of Information Security, 2(1):1-20, Nov. 2003.

McCune, J.M., Perrig, A., Reiter, M.K., Seeing-Is-Believing: Using Camera Phones for Human-Verifiable Authentication, In IEEE Symposium on Security and Privacy, May 2005.

Modadugu, N., Boneh, D., Kim, M., Generating RSA Keys on a Handheld Using an Untrusted Server, In RSA Conference 2000, Jan. 2000.

Ross, B., Jackson, C., Miyake, N., Boneh, D., Mitchell, J.C., Stronger Password Authentication Using Browser Extensions, In 14th USENIX Security Symposium, Aug. 2005.

Ye, E., Smith, S., Trusted Paths for Browsers, In Proceedings of the 11th USENIX Security Symposium, USENIX, Aug. 2002.

Adams, Anne, Sasse, Martina; Users Are Not the Enemy; Communications of the ACM, 42(12); pp. 41-46; 1999.

Clayton, Richard; Who'd Phish From the Summit of Kilimanjaro?; Financial Cryptography; pp. 91-92; 2005.

Dierks, T., Allen, C.; The TLS Protocol Version 1.0; Internet Request for Comment RFC 2246, Internet Engineering Task Force; 1999.

Genkina, Alla; Friedman, Allen, Camp, Jean; Net Trust; Oral Presentation, Trustworthy Interfaces for Passwords and Personal Information (TIPPI) Workshop; 2005.

Goth, Greg; Phishing Attacks Rising, But Dollar Losses Down; IEEE Security and Privacy, 3(1); p. 8; 2005.

Jakobsson, Markus, Young, Adam; Distributed Phishing Attacks; Workshop on Resilient Financial Information Systems; 2005.

Myers, Steve; Delayed Password Disclosure; Oral Presentation, Trustworthy Interfaces for Passwords and Personal Information (TIPPI) Workshop; 2005.

Rohs, Michael, Gfeller, Beat; Using Camera-Equipped Mobile Phones for Interacting With Real-World Objects; Proceedings of Advances in Pervasive Computing; pp. 265-271; 2004.

Seshadri, Arvind, Luk, Mark, Shi, Elaine, Perrig, Adrian, Van Doorn, Leendert, Khosla, Pradeep; Pioneer: Verifying Integrity and Guaranteeing Execution of Code on Legacy Platforms; Proceedings of ACM Symposium on Operating Systems Principles (SOSP); pp. 1-16; 2005.

Wu, Min, Garfinkel, Simon, Miller, Robert; Users are Not Dependable—How to Make Security Indicators to Better Protect Them; Oral Presentation, Trustworthy Interfaces for Passwords and Personal Information (TIPPI) Workshop; 2005.

Yan, Jeff; Blackwell, Alan, Anderson, Ross, Grant, Alasdair; Password Memorability and Security: Empirical Results; IEEE Security and Privacy, 2(5); pp. 25-31; 2004.

* cited by examiner

METHOD AND APPARATUS FOR SECURE ONLINE TRANSACTIONS

CROSS REFERENCE TO RELATED APPLICATIONS

The present application claims priority from U.S. Application Ser. No. 60/872,251 filed Dec. 1, 2006, and entitled User-Error-Resistant, Mobile Device-Based Two-Factor Authentication Method To Secure Online Transactions, the entirety of which is hereby incorporated by reference for all purposes.

GOVERNMENT RIGHTS

This invention was made with government support under NSF Grant No. CNS-0433540. The government has certain rights in this invention.

BACKGROUND

In phishing, an automated form of social engineering, criminals use the Internet to fraudulently extract sensitive information from businesses and individuals, often by impersonating legitimate web sites. The potential for high rewards (e.g., through access to bank accounts and credit card numbers), the ease of sending forged email messages impersonating legitimate authorities, and the difficulty law enforcement has in pursuing the criminals has resulted in a surge of phishing attacks: estimates suggest that phishing affected 1.2 million U.S. citizens and cost businesses billions of dollars in 2004 alone [40].

Phishing also leads to additional business losses due to consumer fear. Anecdotal evidence suggests that an increasing number of people shy away from Internet commerce due to the threat of identity fraud, despite the tendency of U.S. companies to assume the risk for fraud. Also, many users now default to distrusting any email they receive from financial institutions [16].

The importance of the phishing problem has attracted much academic and industrial research. Many of the systems described below represent complementary approaches and could be used in conjunction with our system, particularly to help protect the user during account setup. We discuss related work in three categories: heuristic approaches, password modification, and origin authentication.

A popular initial approach for preventing phishing attempts is to use heuristics to find a pattern in phishing web sites and then alert the user if a given site matches the pattern. Several browser toolbars have been proposed to perform this function, for example SpoofGuard [5], TrustBar [18], eBay Toolbar [12], and SpoofStick [8]. Among other heuristics, these toolbars detect malicious URLs and inform the user about the true domain of the site visited. The Net Trust system incorporates information from users' social networks, as well as centralized authorities, to help users make decisions about a website's trustworthiness [15]. Unfortunately, heuristics are inherently imprecise and invite attackers to adapt to the defenses until they can bypass the heuristics. Such an approach can lead to an arm's race, with all of the problems it entails. In addition, Wu et al. found that 13-54% of users would still visit a phishing website, despite warnings from an anti-phishing toolbar [41].

Phishers often exploit the tendency of users to pick weak passwords and to re-use the same passwords at several websites. If a phisher obtains a password at a low-security site, they can use it to login to a high-security site as well.

One-time passwords are widely used in several contexts, including the S/Key system [17] and corporate uses such as Citibank [6]. The RSA SecurID system is a time-based one-time password, where the password is generated on a hardware token [34]. The user must enter the code in a web form and submit it to the server to show that the possesses the trusted device, but there is no server authentication on the user's part. In addition, the system is vulnerable to an active Man-in-the-Middle attack, since a phisher can intercept the value from the user and then use it to access the user's account. The PwdHash approach uses a cryptographic hash function computed on the user's password and the site name to derive a unique password for each site [33]. PwdHash is a promising system, but is ineffective against pharming or DNS spoofing attacks where a phisher presents the correct domain name to the browser but redirects the request to its server. In the case of DNS attacks, PwdHash will hand the correct password for the site to the phisher. Moreover, PwdHash does not prevent a phisher from breaking a weak master password using dictionary attacks.

Another approach is single-sign-on, where users sign in to a single site that will subsequently handle all authentications with other sites, but so far such systems have encountered consumer resistance, since they involve storing sensitive user data with a third party. If these services did grow in popularity, they would undoubtedly attract the same attention from phishers currently visited on individual sites. Another approach is "Verified by VISA," where merchants redirect clients to a special VISA site which requires a username and password to authenticate the transaction [1].

Unfortunately, none of these approaches provide sufficient protection against Man-in-the-Middle attacks, particularly if the phisher also uses DNS spoofing. As the user enters personal information into the phishing website, the phisher can forward the information to the legitimate banking site. Once authenticated, the adversary has full control over the hijacked connection. Banks have already reported such attacks against their one-time password systems [29]. Our approach precludes such Man-in-the-Middle attacks because the cell phone and server mutually authenticate each other and establish a session key end-to-end.

In a class of countermeasures referred to as origin authentication, researchers propose user-based mechanisms to authenticate the server. Ideally, if the user arrives at a malicious website, he or she will detect that the phishing site is not the correct web site.

Jakobsson presents a theoretical framework for phishing attacks [19]. He also proposes better email authentication to prevent phishing email, in addition to better secrecy protection for user email addresses (such that phishers have a harder time harvesting email addresses from, for example, eBay).

The Petname project [39] associates a user-assigned nickname with each website visited. If the browser loads a page from a spoofed web site, the nickname will be missing or wrong—the approach relies on users to notice either case. In addition, users will likely choose predictable nicknames (e.g., nicknaming Amazon.com's website "Amazon"), making nicknames easy to spoof.

Dhamija and Tygar propose Dynamic Security Skins (DSS) to enable a user to authenticate the server [10, 9]. In their system, a server opens a user-customized popup window that displays an image only the correct server can produce. Similar to the Petname project, this approach relies on the user to perform the verification.

Myers proposes that servers display a series of images as users type their passwords [28]. It would be difficult for phishing sites to guess the correct sequence of images, and users know what images to expect. Again, this scheme relies on the user to perform the verification. Similarly, PassMark stores a secure cookie on the client and sets up an image associated with the account that the user should remember [30]. Unfortunately, PassMark is a proprietary system—they do not disclose a detailed description of their approach.

All of these approaches require user diligence—even a single mistake on the user's part will result in a compromised account. Several of these approaches are also susceptible to Man-in-the-Middle attacks since a phisher can simply forward information between the browser and the legitimate site.

SUMMARY

One aspect of the present disclosure is directed to a method of establishing an account for a user. The method includes establishing a connection between a first device (e.g., a user's computer) and a service provider's server. An account creation message is sent from the server to the first device. The account creation message includes information identifying the server. The account creation message is forwarded from the first device to a second device (e.g., the user's cellphone). The second device then creates a public/private key pair, associates the public/private key pair with the information identifying the server, creates a bookmark of the server's URL, and sends a reply message to the first device. The reply message includes the public key. The reply message is forwarded from the first device to the server. The server associates the public key in the reply message with the user's account.

After the account is set up, a connection may be established between the user and the server by instructing the first device to initiate a connection with the server. The instruction may optionally be sent from the second device using the bookmark stored on the second device. A message including the information identifying the server is sent from the server to the first device. That message, including the information identifying the server, is forwarded from the first device to the second device. The second device compares the received information identifying the server to saved information identifying the server and continues with the creation of a connection only if the received information matches said saved information.

The present discosure includes a foolproof anti-phishing system that does not rely on users to always make the correct security decision. Our mutual authentication protocol uses a trusted device (e.g., a cellphone) both to manage a second authenticator for the user and to authenticate the server. Because a user cannot readily disclose the additional authenticator to a third party, attackers must obtain the user's password and compromise the trusted device to gain account access. By making the trusted device an active participant in the authentication process, our protocol protects the users against Man-in-the-Middle attacks.

Our approach also defends against keyloggers and other mechanisms designed to monitor user input. The user can easily employ our scheme across multiple platforms without relying on the information in the browser's display.

Finally, we demonstrate the practicality of our system with a prototype implementation. We use a cellphone as the trusted device, and we show that the system introduces minimal overhead. In addition, the server-side changes are minor, as well as backwards compatible.

Many variations are possible with the present invention. Functions and implementations other than those described herein may be used with the present invention.

For example, the trusted device can take the form of any computationally enabled mobile device, or could consist of software on the user's primary computing platform. Below we describe the preferred embodiment using a cellphone as the trusted device.

If a mobile device is used, the communication between the mobile device and the computing platform could use any communication channel, such as Wi-Fi, Bluetooth, infrared, or physical cables. Below we describe the preferred embodiment using Bluetooth as the communication channel.

In the preferred embodiment described below, we describe a process where the user mutually authenticates with a website. However, the process of mutual authentication can be used in more general settings where two parties wish to authenticate one another over a network.

These and other teachings, variations, and advantages of the present invention will become apparent from the following detailed description of the invention.

BRIEF DESCRIPTION OF THE DRAWINGS

For the present disclosure to be easily understood and readily practiced, the present disclosure will be described, for purposes of illustration and not limitation, in connection with the following figures wherein:

In FIG. 3, $DH_S$ and $DH_C$ represent the Diffie-Hellman key material for the server and client, respectively, and h is a secure MAC of the handshake messages.

DETAILED DESCRIPTION

Problem Definition

Figure 1:
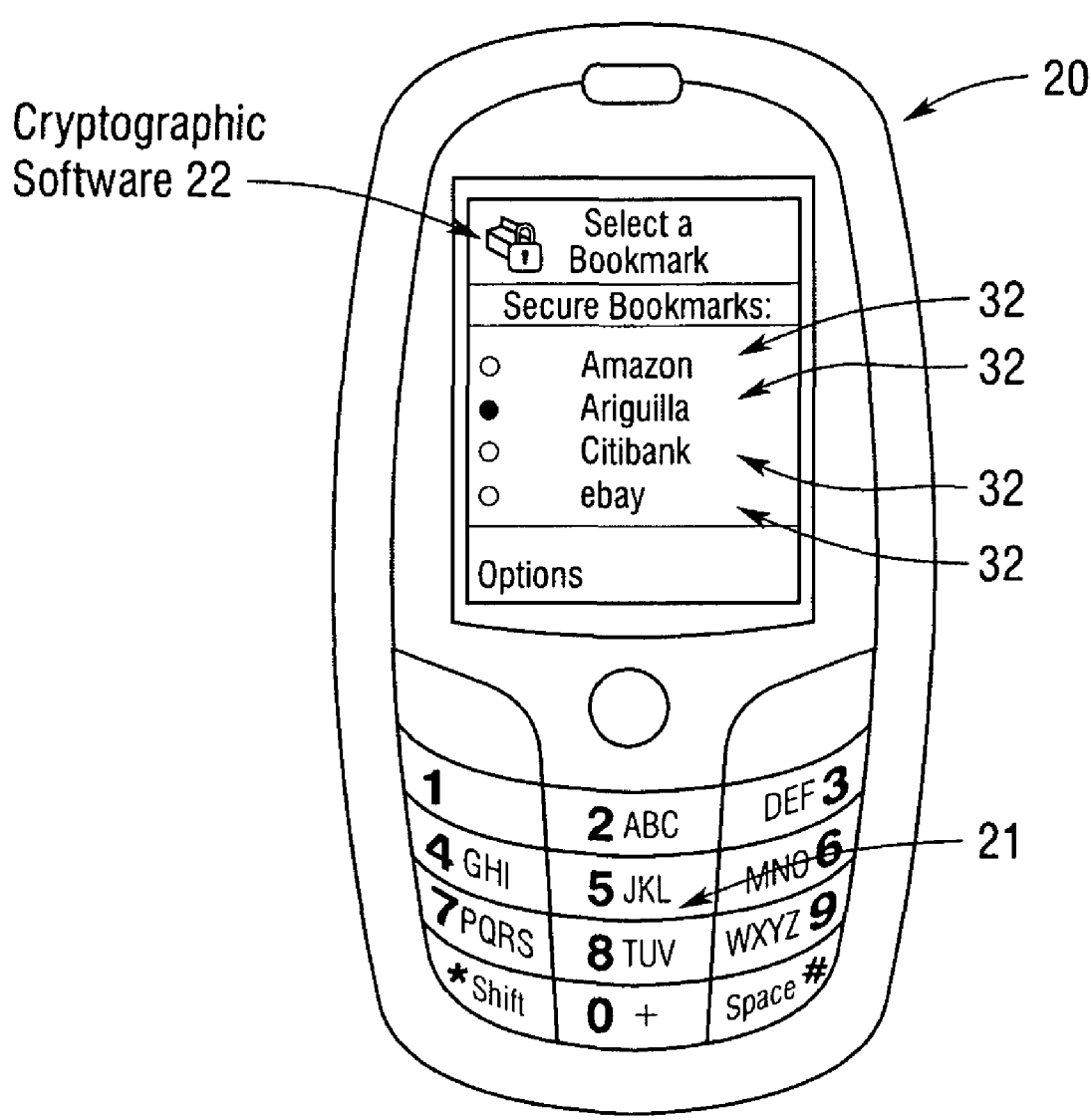
FIG. 1 illustrates a cellphone programmed to provide cryptographic assistance in establishing an account and a connection after the account is established; the cellphone is shown displaying read only bookmarks for sites at which the user has established accounts.

In this section, we consider various formulations of the phishing problem and survey phishing tactics, both those in use today and those likely to appear in the near future. We also consider the aspects of user behavior typically exploited by phishing attacks.

Goals and Assumptions

In this section, we enumerate the goals of an anti-phishing technique, arranged in decreasing order of protection and generality:

Ensure that a user's data only goes to the intended recipient.

Prevent a user's data from reaching an untrustworthy recipient.

Prevent an attacker from abusing a user's data.

Prevent an attacker from modifying a user's account.

Prevent an attacker from viewing a user's account.

Our scheme guarantees the last two goals via technical measures. Clearly, an ideal solution would also address the first goal. However, divining a user's intentions remains a difficult problem, particularly when even the user may find it difficult to quantify his or her precise intentions. The next two goals, while more constrained than the first, require complete control over the user's data. Although we present techniques to assist with the goal of preventing the user's data from reaching an untrustworthy recipient, ultimately, we cannot guarantee this result, since a determined user can always find some means of disclosing personal information to an adversary.

To realize our goals, we assume users can be trusted to correctly identify sites at which they wish to establish accounts. We justify this assumption on the basis of the following observations. First, phishing attacks generally target users with existing accounts. In other words, the phishers attempt to fool a victim with an online account into revealing information that the phishers can use to access that account. Second, users typically exercise greater caution when establishing an account than when using the account or when responding to an urgent notice concerning the account. This results in part from the natural analogue of the real world principle of caveat emptor, where consumers are accustomed to exercising caution when selecting the merchants they wish to patronize. However, consumers in the real world are unlikely to encounter a Man-in-the-Middle attack or an imitation store front, and so they have fewer natural defenses when online. Our solution addresses these new threats enabled by the digital marketplace. Our approach is largely orthogonal to existing anti-phishing solutions based on heuristics, and it can be combined with these earlier schemes, particularly to protect the user from a phishing attack during the initial account establishment.

Attacks

A typical phishing attack begins with an email to the victim, supposedly from a reputable institution, but actually from the phisher. The text of the message commonly warns the user that a problem exists with the user's account that must immediately be corrected. The victim is led to a spoofed website designed to resemble the institution's official website. At this point, the phishing site may launch a passive or an active attack. In a passive attack, the web page prompts the victim to enter account information (e.g., username and password) and may also request other personal details, such as the victim's Social Security number, bank account numbers, ATM PINs, etc. All of this information is relayed to the phisher, who can then use it to plunder the user's accounts. In an active attack, the phisher may act as a man-in-the-middle attacker, actively relaying information from the legitimate site to the user and back.

While early phishing emails typically employed plain text and grammatically incorrect English, current attacks demonstrate increased sophistication. Phishing emails and websites often employ the same visual elements as their legitimate counterparts. As a result, spoofed sites and legitimate sites are virtually indistinguishable to users. Phishers also exploit a number of DNS tricks to further obscure the nature of the attack. The spoofed site may use a domain name like www.e-bay.com.kr, which very closely resembles eBay's actual domain, but instead points to a site in Korea. Some attacks use obscure URL conventions to craft domain names like www.e-bay.com@192.168.0.5, while others exploit bugs in the browser's Unicode URL parsing and display code to conceal the site's true domain name [21].

Although most phishing attacks are initiated via email, there are many other potential means of initiation. The phisher could contact the victim via Instant Messenger, via a popup or other advertisement on another website, or even via fax [22]. Phishers can also exploit mistyped URLs by registering domain names like gooogle.com or goggle.com, or even employ techniques to artificially inflate their rankings in search engines. To make matters worse, researchers have discovered automated phishing kits circulating online that enable novice phishers to employ some of these techniques [36].

Attackers have also been quick to exploit attempts at user education. For instance, many users believe that a transaction is secure if they see the 'lock' icon displayed in the browser window. One possible attack uses JavaScript to display a spoofed lock image in the appropriate location [43]. Phishers may also acquire their own SSL certificate, relying on users' inability or unwillingness to verify the certificates they install. There have also been cases in which Certificate Authorities issued certificates to attackers posing as legitimate Microsoft employees [26]. Phishers can also try to confuse users by simultaneously loading a legitimate page and a spoofed page using HTML frames or popups. Unfortunately, even these techniques barely scratch the surface of potential phishing scams.

Despite the advances and innovations discussed above, phishing attacks are continuously evolving into increasingly sophisticated forms. For example, attackers have begun targeting specific individuals within an organization. These highly customized attacks, dubbed spearphishing, often try to trick employees into installing malware or revealing their organizational passwords [31, 23]. As a more general form of advanced attack, Jakobsson introduces the notion of context-aware phishing in which an attacker exploits some knowledge about the victim in order to enhance the efficacy of the attack [19]. In a user study, Jakobsson found that context-aware phishing attacks dramatically enhanced the probability of a successful attack, from 3% percent for an ordinary attack to 48-96% for a specially-crafted context-aware attack. Another attack variant uses socially-aware phishing. In a socially-aware attack, the phisher uses publicly available information to craft an email that purports to come from someone the victim knows and trusts. To defend against phishing attacks, organizations are in a constant race to detect and take down phishing sites. In the future, this could become even more difficult with distributed phishing attacks [20], where each page a user visits is hosted at a different location and registered to a different owner.

User Issues

In this section, we consider user-related issues for phishing. Some of these observations were also made by Dhamija and Tygar [9].

First, users exhibit certain tendencies that inherently undermine security. Security is often a secondary concern; few users start a web browser with the objective of "doing security." Users want to make purchases, check their accounts and authorize payments online. Because of this, users will tend to ignore or, if they become too invasive, circumvent or disable security measures. Similarly, users have become habituated to ignoring strange warning boxes that appear when they access secure sites, and they blithely click through such warnings. Moreover, prior work shows that humans pick poor passwords with low entropy [42] and readily volunteer them to complete strangers [2]. Finally, users have become accustomed to computers and websites behaving erratically. They will often attribute the absence of security indicators to non-malicious errors [41]. In addition, most users cannot distinguish between actual hyperlinks and spoofed hyperlinks that display one URL but link to a different URL (i.e., URLs of the form: <a href='http://phishing.org/'> <img src='ebay-url.jpg'> </a>). Furthermore, users are unable to reliably parse and understand domain names or PKI certificates.

Clearly, current technology makes it difficult for even a knowledgeable user to consistently make the right decision, particularly when security is not a primary goal. As a result, we argue that anti-phishing techniques must minimize the user's security responsibilities.

While no automated procedure can provide complete protection, our protocol guards the secrecy and integrity of a user's existing online accounts so that attacks are no more effective than pre-Internet scams (e.g., an attacker may still be able to access a user's account by subverting a company insider). We base our system on the observation that users should be authenticated using an additional authenticator that they cannot readily reveal to malicious parties. Our scheme establishes the additional authenticator on a trusted device, such that an attacker must compromise the device and obtain the user's password to access the user's account.

The trusted device in our system can take the form of a cellphone, PDA, smart watch, USB dongle, smart card, laptop, or even as software on the primary computing platform. In a preferred embodiment described herein, we assume the use of a cellphone. Users cannot readily disclose the authenticator on the cellphone to a third party, and servers will refuse to act on instructions received from someone purporting to be a particular user without presenting the proper authenticator. Our technique is one of the first systems to prevent active Man-in-the-Middle attacks. In addition, the use of the cellphone allows us to minimize the effect of hijacked browser windows and facilitates user convenience, because it can be used at multiple machines. We assume that the user can establish a secure connection between their cellphone and their browser and that the cellphone itself has not been compromised.

Below, we explain how a user creates an account (or updates an existing account) using our protocol. We then define the protocol for account usage, as well as steps for recovering if the user's trusted device is lost or compromised.
Setup To enable our system for an online account, the user must (according to a preferred embodiment) establish a shared secret with the server. This can be done using one of the out-of-band channels 10 (see FIG. 2) suggested below. These mechanisms for establishing a shared secret rely on institutions to implement measures that ensure 1) their new customers are who they say they are, and 2) the information in existing customers' files is accurate. Institutions have dealt with this problem since well before the existence of computers, and thus, they have well-established techniques for doing so.

The out-of-band channel used for establishing a shared secret can take many forms. For example, banks often utilize the postal service as a trusted side-channel. Alternatively, a telephone call may suffice. Banks could provide the shared secret at ATMs by displaying the shared secret in the form of a barcode that the user could photograph with the camera on a cellphone [25, 32]. As another possibility, initial account setup could be performed on the premises of the financial institution. That way, employees can be trained to assist users with setup; users' identification can be checked in person; and users can trust that they are associating with the correct institution. Trusted financial institutions could also provide setup services for organizations that lack brick-and-mortar infrastructure, such as online vendors.

Figure 2:
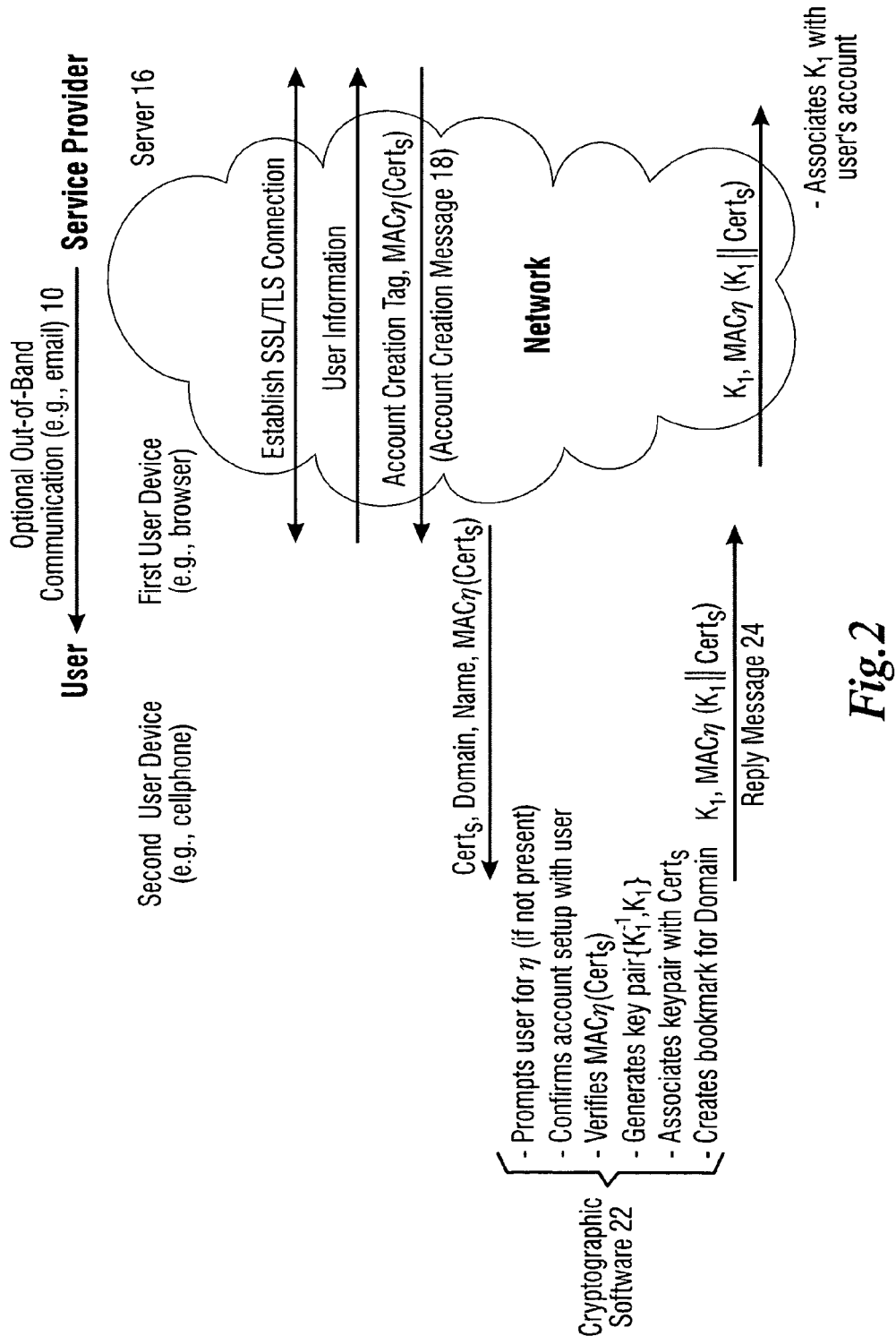
FIG. 2 illustrates one embodiment of a protocol for establishing a new user account according to the present disclosure.

A preferred embodiment will now be described in conjunction with FIG. 2 and FIG. 4A. Using one of the out-of-band mechanisms 10 discussed above, the institution (service provider) sends a randomly chosen secret η to the user. The secret should be of sufficient length (e.g., 80-128 bits) to prevent brute-force attacks. The user, using for example a browser 12 on the user's computer 14 (i.e., a first device), navigates to the institution's website hosted on a server 16 and initiates setup.

The setup steps are summarized in FIG. 2 and described below. The server 16 responds with an account creation message 18 including a specially crafted HTML tag (e.g., <!—SECURE-SETUP→), which signals to the browser 12 that account setup has been initiated. The server 16 also authenticates its SSL/TLS certificate by including a MAC of the certificate, using the shared secret η as a key.

The browser 12 contacts a second device (cellphone 20) via Bluetooth (our system is not exclusive to Bluetooth. Any mechanism that allows the user's trusted device to communicate with the browser (e.g., infrared, 802.11, USB cable, etc.) will suffice), transmitting the server's SSL/TLS certificate, domain name, site name and MAC to the cellphone 20. The cellphone 20 may be of the type that has a keypad 21 (seen in FIG. 1) and a camera 23 (seen in FIG. 4A). The cellphone 20 is programmed with cryptographic software 22 which prompts the user to confirm the account creation (to avoid stealth installs by malicious sites) and enter the shared secret provided by the institution (if it has not already been entered, e.g., at the ATM or at the financial institution). The software 22 also verifies the MAC on the server's certificate and aborts the protocol if the verification fails. Assuming verification succeeds, the software 22 creates a public/private key pair $\{K_1, K_1^{-1}\}$ and saves a record associating the key pair with the server's certificate, which is also saved. The software 22 creates a secure bookmark entry for the site, using the site's name and domain name. The cellphone 20 sends a reply message 24 including the new public key authenticated with a MAC, using the shared secret as a key, to the server 16 through the user's computer 14. The server 16 associates the public key with the user's account, and henceforward, the client must use the protocol described in the next section to access the online account. All other online attempts to access the account will be denied (Note that this does not preclude a user from conducting business in person, for example.)

Note that the shared secret provides additional authenticity, but is nevertheless optional. Use of a shared secret will likely be required for service providers such as banks. However, some service providers are happy to set up an account as soon as the user provides a credit card. For example, most merchants don't do any additional checking when a user signs up for an account. In that case, as long as the user arrives at the true merchant site and not a phishing site the very first time, then when the software 22 sets up the key pair, the user will be safe during subsequent visits, even without having used the shared secret to set up the account.

Secure Connection Establishment

Once the user's account has been enabled, the server 16 will refuse access to the account unless the user is properly authenticated via the established public key pair and the user's credentials, e.g., a username/password combination. Thus, even if the user is tricked into revealing private information to a phisher or a social engineer, the attacker still cannot access the user's account.

Figure 3:
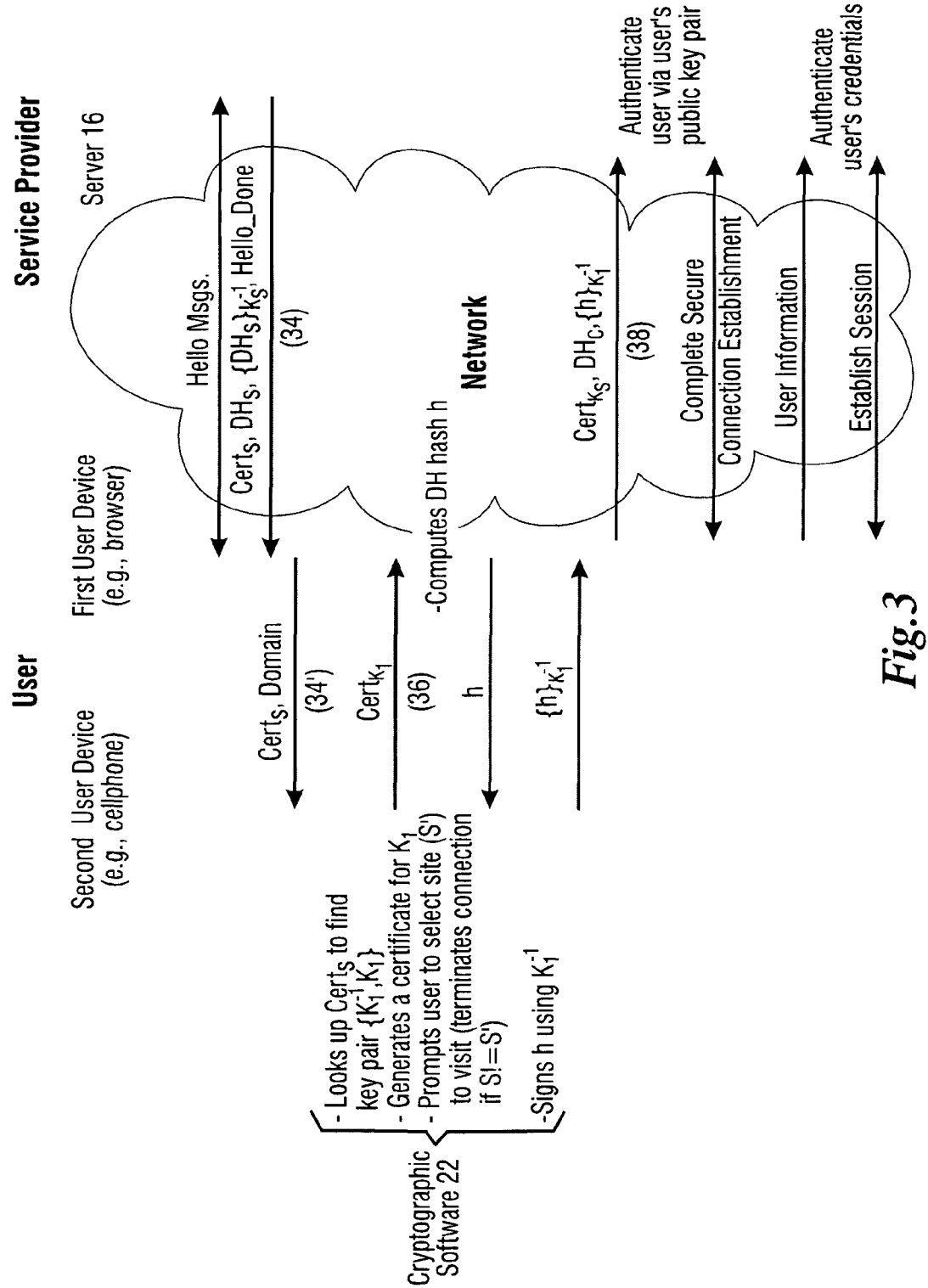
FIG. 3 illustrates one embodiment of a protocol for establishing an SSL/TLS connection to a server using client authentication, with cryptographic assistance from the cellphone, according to the present disclosure.

According to a preferred embodiment, a user who wishes to access the account will initiate a connection using the browser 12 (see FIG. 3).

When the server 16 provides its SSL/TLS certificate at 34 in FIG. 3, the browser 12 forwards the certificate 34' to the cellphone 20. If the certificate does not match the saved certificate for that server that was previously provided, the cryptographic software 22 closes the browser window and displays a warning message. If the server 16 updates its certificate, then we need a protocol to update the server certificate stored on the cellphone; for example, the server 16 could send the new certificate along with a signature using the previous private key, and upon successful verification, the cryptographic software 22 can update the certificate it has stored for that server 16.

If the certificate check is successful, the cellphone will prompt the user to select the site she wishes to visit from the list of secure bookmarks 32 on the cellphone 20 shown in FIG. 1. If the bookmark selected matches the server information provided in message 34', the browser 12 and the server 16 continue to establish an SSL/TLS connection [11, 14], with cryptographic assistance from the cryptographic software 22. The cryptographic software 22 assists the browser in performing the client authentication portion of the SSL/TLS establishment, using the public key pair associated with this site (the SSL/TLS protocol includes a provision for user authentication, but this is rarely used today).

FIG. 3 summarizes the messages exchanged. Essentially, the browser 12 initiates an SSL/TLS connection with Ephemeral Diffie-Hellman key agreement. After agreeing on the cryptographic parameters in the Hello messages, the server 16 sends at 34:

$$\text{Cert}_S, g, p, g^s \bmod p, \{g, p, g^s \bmod P\}_{KS}-1 \quad (1)$$

(i.e., its certificate, its ephemeral Diffie-Hellman key information and a signature on the key information) to the client/user. The browser sends the server's certificate and domain 34' to the cellphone 20, and assuming that the certificate check is successful, the browser 12 retrieves the appropriate user certificate $\text{Cert}_{K1}$ from the cellphone 20 at 36.

The browser 12 then generates the necessary Diffie-Hellman key material and calculates a secure hash of the SSL/TLS master secret K (which is based on the derived Diffie-Hellman key) and all of the previous handshake messages (as well as the client's choice of Diffie-Hellman key material), HM, as follows:

$$h = MD5(K\|\text{pad}_2\|MD5(HM\|K\|\text{pad}_1))\| \\ SHA\text{-}1(K\|\text{pad}_2\|SHA\text{-}1(HM\|K\|\text{pad}_1)) \quad (2)$$

(where $\|$ represents concatenation) and sends the hash (h in FIG. 3) to the cryptographic software 22 on the cellphone 22. The cryptographic software 22 replies with a signature on h. Note that as long as the cellphone 22 remains uncompromised, an attacker cannot produce this signature, and hence cannot successfully authenticate as the user. The browser 12 forwards the signature to the server 16, along with the user's certificate and the client's Diffie-Hellman key material at 38:

$$\text{Cert}_{K1}, g^c \bmod p, \{h\}_K-1 \quad (3)$$

The browser 12 and the server 16 then exchange the final phase of an SSL/TLS negotiation. Once the user has been authenticated and the SSL/TLS connection has been established, the user may then be prompted to provide the user's credentials (e.g., a user name and user password). Assuming that the user's credentials are valid, a session is established and the user can use the browser 12 to conduct transactions and account inquiries as usual. Note that we do not change the SSL/TLS protocol; we merely use the cellphone 20 to assist the browser (by providing the user certificate 36 and the signed hash h) in establishing a session key with the server 16.

Figure 4A:
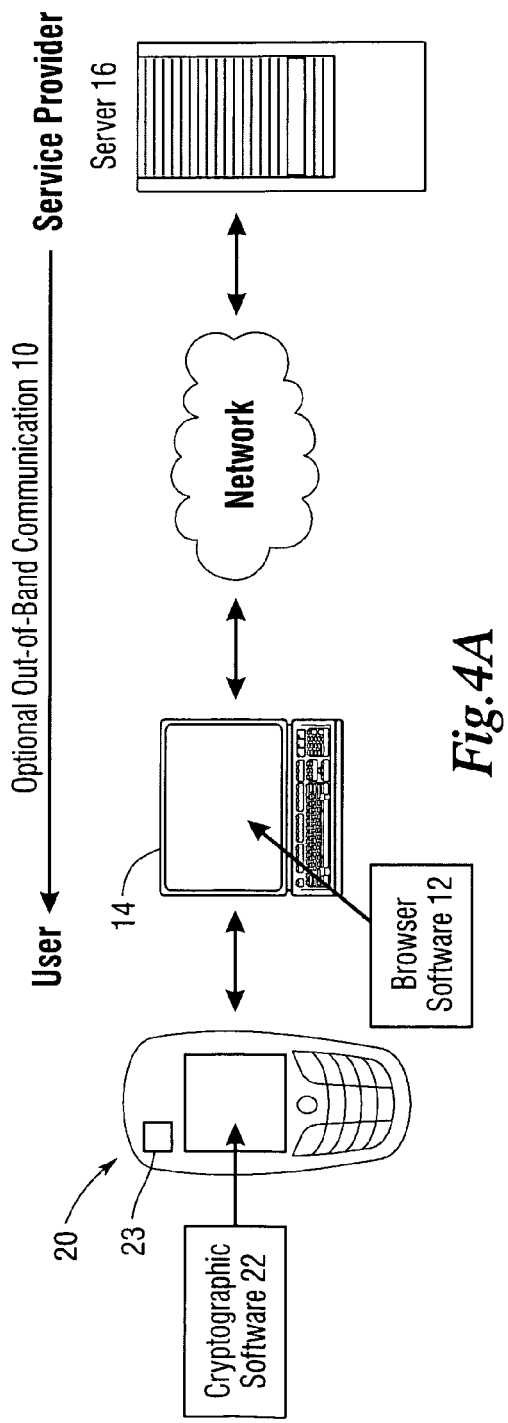
FIGS. 4A and 4B illustrate two systems on which the methods of the present disclosure may be practiced.
Figure 4B:
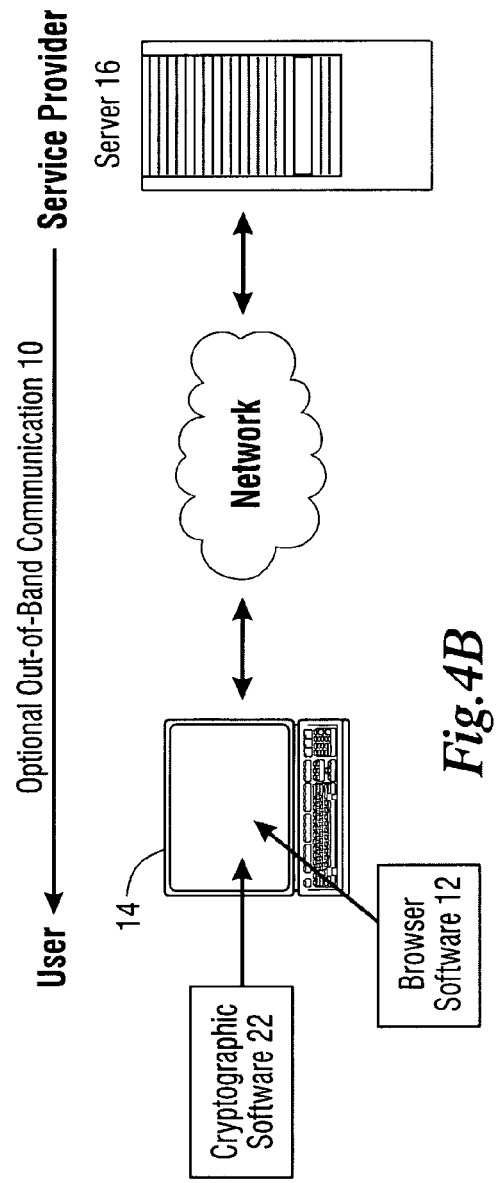

An alternative embodiment is shown in FIG. 4B in which both the browser 12 and cryptographic software 22 are on the same physical device. Although this arrangement does not provide as much security as the preferred embodiment illustrated in FIG. 4A, the embodiment of the FIG. 4B nonetheless represents one of the many various different ways in which the first device and second device may be implemented. As noted previously, other embodiments could include a PDA, smart watch, USB dongle, smart card, or laptop as the second device.

Recovery

Inevitably, users will lose or break their cellphones, or replace them with newer models. When this happens, the user must revoke the old keys and establish a new key pair with a new cellphone. In the case of a lost cellphone, revocation prevents an attacker from accessing the user's accounts.

To revoke the old key pairs, we favor using a process that exists today: the user calls the institution via telephone. This is a well-established, familiar process. Today, customers already call credit card companies to report the loss of a card and to freeze any transactions on the account. With the loss of a cellphone, users would still call the institutions to revoke their keys. The institution would then send the information needed to establish a new key pair using the techniques described above.

We initially considered other methods, such as storing revocation information in the user's browser or on a USB key. However, telephone calls are superior for three reasons. First, users already know how to call customer service. The reuse of an existing business process reduces the costs—mental and monetary—for all parties. Second, cellphones are mobile devices that travel with their users, and users may lose them anywhere. A user whose cellphone is lost on a business trip should act immediately to minimize financial (or other) losses; waiting to access the revocation information stored at home is not acceptable. Finally, because revocation information is rarely used, it is easily lost. For example, if revocation information is stored on paper, CD's, or USB keys, it can be misplaced or damaged.

Prototype Implementation

We now describe a prototype of the invention implemented using a cellphone 20, a web browser 12 and a server 16 as shown in FIG. 4A.

Implementation Details

Equipping a server with our system requires very minimal changes, namely changes to two configuration options and the addition of two simple Perl scripts. From the server's perspective, our scheme requires no changes to the SSL/TLS protocol. Indeed, most major web servers, including Apache-SSL, Apache+mod ssl and Microsoft's IIS already include an option for performing client authentication. In our case, we use Apache-SSL and enable the SSLVerifyClient option that indicates that clients may present certificates, but the certificates need not be signed by a trusted Certificate Authority (since our client certificates are self-signed). We also enable the SSLExportClientCertificates option that exports information about the client's certificate to CGI-accessible variables. Aside from these two minor configuration changes, we only need two additional CGI scripts (written in Perl) to implement the server's side of the protocol. One script handles account creation and writes user information and public keys to a file. When the client attempts to use the account, it provides a self-signed certificate as part of the normal SSL/TLS authentication process. The server's existing SSL/TLS module verifies that the signature in the certificate corresponds to the public key enclosed and provides the information in the client's certificate to the authentication script. The authentication script checks the public key in the certificate against that associated with the user's account. If the keys match, then the authentication script permits the client to access the site. This approach has several benefits. First, the changes are extremely minor and nonintrusive. Second, it still allows legacy clients to establish an SSL/TLS connection with the server. The authentication script can then detect whether the client has presented a legitimate certificate. If the script detects a legacy client, it can make a policy decision as to whether to allow the client access to the account, allow restricted access to the account, or redirect the client to the account creation page.

On the client side, we use an extension to Firefox, an open-source web browser, to detect account creation. When the extension detects a page containing the account creation tag, it signals the cellphone with the appropriate information, and passes the cellphone's reply to the server. Similarly, when the user selects a secure bookmark on the cellphone, the cellphone sends the URL to the extension, which redirects the browser to the appropriate site. We also apply a small patch to the Firefox code that handles the client authentication portion of the SSL/TLS exchange. Instead of patching Firefox, we could also implement our scheme as an SSL/TLS proxy on the user's computer. This would enable our solution to work with proprietary browsers as well. The patch passes the server's certificate to the cellphone, along with a hash of the SSL/TLS handshake messages and receives from the cellphone a certificate for the user's public key and a signature on the hash. The browser can then use these items to complete the SSL/TLS handshake. By involving the cellphone in the SSL/TLS computations, we guarantee that the private key for the account never leaves the phone, preventing even a compromised browser or OS from accessing it.

Our prototype runs on a Nokia 6630 cellphone. We developed a Java MIDlet (an application conforming to the Mobile Information Device Profile (MIDP) standard) that provides the functionality described earlier with a user-friendly interface. A Java implementation also simplifies porting the code to other devices. For the cryptographic operations, we use the light-weight cryptography library provided by Bouncy Castle [38]. Since key generation can require a minute or two, we precompute keys when the user first starts the application, rather than waiting until an account has been created. When the cellphone receives an account creation packet from the browser extension, it selects an unused key pair, assigns it to the server information provided by the browser extension, and then sends the key pair and the appropriate revocation messages to the browser extension. When the user selects a secure bookmark (see FIG. 1), the cellphone sends the appropriate address to the browser extension. It also computes the appropriate signatures during the SSL/TLS exchange.

ENDNOTES

[1] Verified by VISA. http://usa.visa.com/personal/security/vbv/how it works.html.
[2] A. Adams and M. A. Sasse. Users are not the enemy. Communications of the ACM, 42(12):40-46, December 1999.
[3] Anti-Phishing Working Group. Phishing activity trends report. http://antiphishing.org/apwg phishing activity report august 05.pdf, August 2005.
[4] Bluetooth SIG. Bluetooth Technology Benefits. http://www.bluetooth.com/Bluetooth/Learn/Benefits/.
[5] N. Chou, R. Ledesma, Y. Teraguchi, D. Boneh, and J. C. Mitchell. Client-side defense against web-based identity theft. In NDSS, February 2004.
[6] CitiBank. Virtual account numbers. http://www.citibank.com/us/cards/tour/cb/shpvan.htm.
[7] R. Clayton. Who'd phish from the summit of kilimanjaro? In Financial Cryptography, pages 91-92, 2005. Core Street. Spoofstick. http://www.corestreet.com/spoofstick/.
[9] R. Dhamija and J. D. Tygar. The battle against phishing: Dynamic security skins. In ACM Symposium on Usable Security and Privacy (SOUPS '05), July 2005.
[10] R. Dhamija and J. D. Tygar. Phish and HIPs: Human interactive proofs to detect phishing attacks. In Human Interactive Proofs: Second International Workshop (HIP 2005), May 2005.
[11] T. Dierks and C. Allen. The TLS protocol version 1.0. Internet Request for Comment RFC 2246, Internet Engineering Task Force, January 1999. Proposed Standard.
[12] eBay. eBay toolbar. http://pages.ebay.com/ebay toolbar.
[13] FDIC. Authentication in an internet banking environment. Technical Report FIL-103-2005, Federal Deposit Insurance Corporation, October 2005.
[14] A. Freier, P. Kariton, and P. Kocher. The SSL protocol: Version 3.0. Internet draft, Netscape Communications, 1996.
[15] A. Genkina, A. Friedman, and J. Camp. Net trust. Trustworthy Interfaces for Passwords and Personal Information (TIPPI) Workshop, June 2005.
[16] G. Goth. Phishing attacks rising, but dollar losses down. IEEE Security and Privacy, 3(1):8, January-February 2005.
[17] N. Haller. The S/Key one-time password system. In Proceedings of the Symposium on Network and Distributed Systems Security, pages 151-157, February 1994.
[18] A. Herzberg and A. Gbara. Trustbar: Protecting (even naive) web users from spoofing and phishing attacks. Cryptology ePrint Archive, Report 2004/155, 2004.
[19] M. Jakobsson. Modeling and preventing phishing attacks. In Financial Cryptography, 2005.
[20] M. Jakobsson and A. Young. Distributed phishing attacks. Workshop on Resilient Financial Information Systems, March 2005.
[21] E. Johanson. The state of homograph attacks. http://www.shmoo.com/idn/homograph.txt, February 2005.
[22] J. Leyden. Fax-back phishing scam targets paypal. http://www.channelregister.co.uk/2005/08/11/fax-back phishing scam/.
[23] J. Leyden. Spear phishers launch targeted attacks. http://www.theregister.co.uk/2005/08/02/ibm malware report/, August 2005.
[24] P. MacKenzie and M. K. Reiter. Networked cryptographic devices resilient to capture. International Journal of Information Security, 2(1):1-20, November 2003.
[25] J. M. McCune, A. Perrig, and M. K. Reiter. Seeing is believing: Using camera phones for humanverifiable authentication. In IEEE Symposium on Security and Privacy, May 2005.
[26] Microsoft. Erroneous VeriSign-issued digital certificates pose spoofing hazard. http://www.microsoft.com/technet/security/bulletin/MS01-017.mspx, 2001.
[27] N. Modadugu, D. Boneh, and M. Kim. Generating RSA keys on a handheld using an untrusted server. In RSA Conference 2000, January 2000.
[28] S. Myers. Delayed password disclosure. Trustworthy Interfaces for Passwords and Personal Information (TIPPI) Workshop, June 2005.
[29] Out-law.com. Phishing attack targets one-time passwords. http://www.theregister.co.uk/2005/10/12/outlaw phishing/, October 2005.
[30] Passmark Security. Protecting your customers from phishing attacks: an introduction to passmarks. http://www.passmarksecurity.com/, 2005.
[31] P. F. Roberts. Spear phishing attack targets credit unions. http://www.eweek.com/article2/0,1895,1902896,00.asp, December 2005.

[32] M. Rohs and B. Gfeller. Using camera-equipped mobile phones for interacting with real-world objects. In Proceedings of Advances in Pervasive Computing, pages 265-271, April 2004.

[33] B. Ross, C. Jackson, N. Miyake, D. Boneh, and J. C. Mitchell. Stronger password authentication using browser extensions. In 14th USENIX Security Symposium, August 2005.

[34] RSA Security. Protecting against phishing by implementing strong two-factor authentication. htttps://www.rsasecurity.com/products/securid/whitepapers/PHISHWP0904.pdf, 2004

[35] A. Seshadri, M. Luk, E. Shi, A. Perrig, L. van Doorn, and P. Khosla. Pioneer: Verifying integrity and guaranteeing execution of code on legacy platforms. In Proceedings of ACM Symposium on Operating Systems Principles (SOSP), pages 1-16, October 2005.

[36] Sophos. Do-it-yourself phishing kits found on the internet, reveals sophos. http://www.sophos.com/spaminfo/articles/diyphishing.html.

[37] D. Standish. Telephonic youth. http://www.techcentralstation.com/090903C.html.

[38] The Legion of the Bouncy Castle. Bouncy Castle crypto APIs. http://www.bouncycastle.org.

[39] Waterken Inc. Petname tool. http://www.waterken.com/user/PetnameTool/, 2005.

[40] Wikipedia. Phishing. http://en.wikipedia.org/wiki/Phishing.

[41] M. Wu, S. Garfinkel, and R. Miller. Users are not dependable—how to make security indicators to better protect them. Talk presented at the Workshop for Trustworthy Interfaces for Passwords and Personal Information, June 2005.

[42] J. Yan, A. Blackwell, R. Anderson, and A. Grant. Password memorability and security: Empirical results. IEEE Security and Privacy, 2(5):25-31, September-October 2004.

[43] E. Ye and S. Smith. Trusted paths for browsers. In Proceedings of the 11th USENIX Security Symposium. USENIX, August 2002.

What is claimed is:

1. A method of establishing an account for a user, comprising:
communicating a shared secret key between a server and the user using an out-of-band communication channel;
establishing a connection between a first computationally-enabled hardware device and the server;
sending an account creation message from the server to the first computationally-enabled hardware device, said account creation message being generated using the shared secret key and including information identifying the server;
forwarding information in the account creation message from the first computationally-enabled hardware device to a second computationally-enabled hardware device, wherein said second computationally-enabled hardware device:
prompts the user to confirm that an account is to be created,
creates a public/private key pair,
associates the public/private key pair with the information identifying the server,
creates a bookmark of the server's URL, and
sends a reply message to the first computationally-enabled hardware device, said reply message including the public key;
forwarding information in the reply message from the first computationally-enabled hardware device to the server; and
the server associating the public key in the reply message with the user's account.

2. The method of claim 1, wherein the out-of-band communication channel is e-mail, postal service, telephone, or in-person communication.

3. The method of claim 1 additionally comprising said second computationally-enabled hardware device verifying the information identifying the server using said shared secret key.

4. The method of claim 1 wherein said creation message comprises an account creation tag, a certificate, and a MAC of the certificate.

5. The method of claim 4 wherein said reply message comprises the MAC, keyed with the shared secret, on the public key concatenated with the server's certificate.

6. A method of establishing a secure connection between a user having an account with a server established as set forth in claim 1, said method of establishing a connection, comprising:
instructing the first computationally-enabled hardware device to initiate a connection with the server;
sending a message including the information identifying the server from the server to the first computationally-enabled hardware device;
forwarding the information identifying the server from the first computationally-enabled hardware device to the second computationally-enabled hardware device;
prompting, with the second computationally-enabled hardware device, the user to select a server to visit, and continuing with the establishment of the secure connection only if said selection matches said information identifying the server;
comparing, with the second computationally-enabled hardware device, the received information identifying the server to saved information identifying the server; and
continuing with the creation of a secure connection only if said received information matches said saved information.

7. The method of claim 6 wherein the user is prompted to select a server to visit from a list of secure bookmarks on the second computationally-enabled hardware device.

8. A method of establishing an account, comprising:
establishing a shared secret between a user and a service provider using an out-of-band communication channel;
establishing a connection between a browser on the user's computer and the service provider's server;
sending an account creation tag, a certificate, and a MAC of the certificate using the shared secret as a key from the server to the browser;
forwarding the account creation tag, certificate, and MAC from the browser to a mobile device;
verifying the MAC on the server certificate using the shared secret on the mobile device;
prompting the user to confirm that an account is to be created;
creating a public/private key pair on the mobile device;
creating and saving a record associating the public/private key pair with the server's certificate on the mobile device;
creating a bookmark on the mobile device of the server's URL;

sending the public key, authenticated with said MAC using the shared secret as a key, from the mobile device to the browser;

forwarding the public key, authenticated with said MAC using the shared secret as a key, from the browser to the server; and associating the public key with the user's account.

9. The method of claim 8 wherein the out-of-band communication channel is e-mail, postal service, telephone, or in-person communication.

10. The method of claim 8 additionally comprising prompting the user to input said shared secret key into the mobile device.

11. A method of establishing a session between a user having an account with a server established as set forth in claim 8, said method of establishing a session, comprising:

instructing the browser on the user's computer to initiate a connection with the server;

sending a message including the information identifying the server from the server to the browser;

forwarding the information identifying the server from the browser to the mobile device;

prompting, with the mobile device, the user to select a server to visit, and continuing with the establishment of the session only if said selection matches said information identifying the server;

comparing the received information identifying the server to saved information identifying the server;

creating a secure connection only if said received information matches said saved information;

providing user credentials to the server via said secure connection; and establishing the session only if said user credentials are authentic.

12. A system for establishing an account for a user, comprising:

a first computationally-enabled hardware device for establishing a connection with a server of a service provider, and for relaying information between said server and a second computationally-enabled hardware device;

a server for sending an account creation message to the first computationally-enabled hardware device, said account creation message being generated using a shared secret key and including information identifying the server, said server further associating a public key in a reply message with the user's account, said shared secret key being communicated between the server and the user using an out-of-band communication channel;

the second computationally-enabled hardware device programmed to, upon receipt of said account creation message:

prompt the user to confirm that an account is to be created;

create a public/private key pair;

associate the public/private key pair with the information identifying the server;

create a bookmark of the server's URL; and send said reply message to the first computationally-enabled hardware device, said reply message including the public key.

13. The system of claim 12 wherein said second computationally-enabled hardware device includes one of a cellphone, PDA, smart watch, USB dongle, smart card, or laptop.

14. The system of claim 12 wherein said second computationally-enabled hardware device has an input for receiving the shared secret key.

15. The system of claim 14 wherein said second computationally-enabled hardware device includes a cellphone having a data input mechanism.

16. A method of establishing a secure connection over a network between a user and a service provider's server, comprising:

instructing a first computationally-enabled hardware device to initiate a connection with a server of a service provider;

sending a message including a certificate from the server to the first computationally-enabled hardware device;

forwarding the certificate to a second computationally-enabled hardware device;

prompting, with the second computationally-enabled hardware device, the user to select a server to visit, and continuing with the establishment of the secure connection only if said selection matches information in the message;

comparing the received certificate to a saved certificate associated with the server; and if said received certificate matches said saved certificate, continuing with the creation of a connection with the cryptographic assistance of the second computationally-enabled hardware device.

17. A method of establishing a secure connection over a network between a user's mobile device and a service provider's server in which a user's computer relays information from the server to the mobile device and from the mobile device to the server, the mobile device performing a method comprising:

instructing the user's computer to initiate a connection with the server;

receiving, at the user's mobile device after being relayed by the user's computer, a certificate from the server;

prompting the user to select a server to visit, and continuing with the establishment of the secure connection only if said selection matches information in the certificate;

comparing the received certificate to a saved certificate associated with the server; and if said received certificate matches said saved certificate, providing cryptographic assistance to the user's computer to complete the establishment of a secure connection.

18. The method of claim 17 wherein said providing cryptographic assistance includes providing a certificate and providing a signature on a hash.

19. A mobile device configured to establish a connection over a network with a service provider's server using a user's computer to relay messages from the server to the mobile device and from the mobile device to the server, the mobile device configured to perform a method comprising:

instructing the user's computer to initiate a connection with the server;

receiving, at the user's mobile device after being relayed by the user's computer, a certificate from the server;

prompting the user to select a server to visit, and continuing with the establishment of the connection only if said selection matches information in the certificate;

comparing the received certificate to a saved certificate associated with the server; and if said received certificate matches said saved certificate, providing cryptographic assistance to the user's computer to complete the establishment of a secure connection.

* * * * *